(12) United States Patent
Nakamura et al.

(10) Patent No.: US 12,144,462 B2
(45) Date of Patent: Nov. 19, 2024

(54) HEATING COOKING APPARATUS AND BUILT-IN HEATING COOKING SYSTEM

(71) Applicant: SHARP KABUSHIKI KAISHA, Sakai (JP)

(72) Inventors: Keigo Nakamura, Sakai (JP); Shunichi Ohnaka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 401 days.

(21) Appl. No.: 17/642,932

(22) PCT Filed: Sep. 24, 2020

(86) PCT No.: PCT/JP2020/035948
§ 371 (c)(1),
(2) Date: Mar. 14, 2022

(87) PCT Pub. No.: WO2021/060344
PCT Pub. Date: Apr. 1, 2021

(65) Prior Publication Data
US 2022/0361714 A1 Nov. 17, 2022

(30) Foreign Application Priority Data

Sep. 26, 2019 (JP) .................................. 2019-175504

(51) Int. Cl.
*A47J 36/24* (2006.01)
*A47J 37/06* (2006.01)
(Continued)

(52) U.S. Cl.
CPC ....... *A47J 37/0664* (2013.01); *A47J 36/2483* (2013.01); *A47J 37/0629* (2013.01);
(Continued)

(58) Field of Classification Search
CPC ................ A47J 37/0664; A47J 37/0629; A47J 36/2483; F24C 7/02; F24C 7/04; F24C 15/08; H05B 6/12
(Continued)

(56) References Cited

U.S. PATENT DOCUMENTS 8,291,816 B2  10/2012  Iwamoto et al.
10,602,572 B2  3/2020  Takimoto et al.
(Continued)

FOREIGN PATENT DOCUMENTS

CN  204303974 U  4/2015
JP  2003-110333 A  4/2003
(Continued)

*Primary Examiner* — Avinash A Savani
(74) *Attorney, Agent, or Firm* — ScienBiziP, P.C.

(57) ABSTRACT

A heating cooking apparatus (100) includes a heating cooking unit, a communication unit (40), a container portion (30), and a movable member (55). The heating cooking unit heats and cooks an object to be heated. The communication unit (40) wirelessly communicates with an external device. The container portion (30) contains the communication unit (40). The movable member (55) moves between a first position and a second position. The first position indicates a position of the movable member (55) when the movable member (55) is separated from the container portion (30). The second position indicates a position of the movable member (55) when the movable member (55) is closer to the container portion (30) than in the first position.

6 Claims, 11 Drawing Sheets

(51) Int. Cl.
    *F24C 7/02*     (2006.01)
    *F24C 7/04*     (2021.01)
    *F24C 15/08*    (2006.01)
    *H05B 6/12*     (2006.01)

(52) U.S. Cl.
    CPC .................. *F24C 7/02* (2013.01); *F24C 7/04*
            (2013.01); *F24C 15/08* (2013.01); *H05B 6/12*
                                                  (2013.01)

(58) Field of Classification Search
    USPC ..................................................... 126/273 R
    See application file for complete search history.

(56) References Cited

U.S. PATENT DOCUMENTS

| | | | |
|---|---|---|---|
| 2009/0301312 A1 | 12/2009 | Iwamoto et al. | |
| 2016/0348918 A1* | 12/2016 | Bhogal | ................... F24C 15/04 |
| 2017/0332447 A1 | 11/2017 | Takimoto et al. | |
| 2020/0170082 A1 | 5/2020 | Takimoto et al. | |
| 2021/0360203 A1* | 11/2021 | Bauer | ................... A47J 36/321 |

FOREIGN PATENT DOCUMENTS

| | | | |
|---|---|---|---|
| JP | 2004-139834 A | 5/2004 |
| JP | 2009-293845 A | 12/2009 |
| JP | 2013-021500 A | 1/2013 |
| JP | 2014-202407 A | 10/2014 |
| JP | 2015-207398 A | 11/2015 |
| JP | 2016-138724 A | 8/2016 |

\* cited by examiner

HEATING COOKING APPARATUS AND BUILT-IN HEATING COOKING SYSTEM

TECHNICAL FIELD

The present invention relates to a heating cooking apparatus and a built-in heating cooking system.

BACKGROUND ART

PTL 1 discloses a home appliance equipped with a communication antenna. The home appliance equipped with the communication antenna disclosed in PTL 1 includes an apparatus main body, an antenna, and a power cord. The antenna is incorporated near a tip of the power cord.

CITATION LIST

Patent Literature

PTL 1: JP 2003-110333 A

SUMMARY OF INVENTION

Technical Problem

In the home appliance equipped with the communication antenna disclosed in PTL 1, since the antenna is incorporated near the tip of the power cord, the antenna may be hidden by furniture and the like. As a result, the home appliance equipped with the communication antenna disclosed in PTL 1 may not be able to receive information from an external device.

In light of the above problem, an object of the present invention is to provide a heating cooking apparatus and a built-in heating cooking system capable of appropriately communicating with an external device.

Solution to Problem

According to one aspect of the present application, a heating cooking apparatus includes a heating cooking unit, a communication unit, a container portion, and a movable member. The heating cooking unit is configured to heat and cook an object to be heated. The communication unit is configured to wirelessly communicate with an external device. The container portion is configured to contain the communication unit. The movable member is configured to move between a first position and a second position. The first position indicates a position of the movable member when the movable member is separated from the container portion. The second position indicates a position of the movable member when the movable member is closer to the container portion than in the first position.

According to one aspect of the present application, the built-in heating cooking system includes the heating cooking apparatus described above, a pull-out body freely pulled out with respect to the heating cooking unit, and a cabinet.

Advantageous Effects of Invention

According to a heating cooking apparatus and a built-in heating cooking system of the present invention, it is possible to appropriately communicate with an external device.

DESCRIPTION OF EMBODIMENTS

Figure 1:
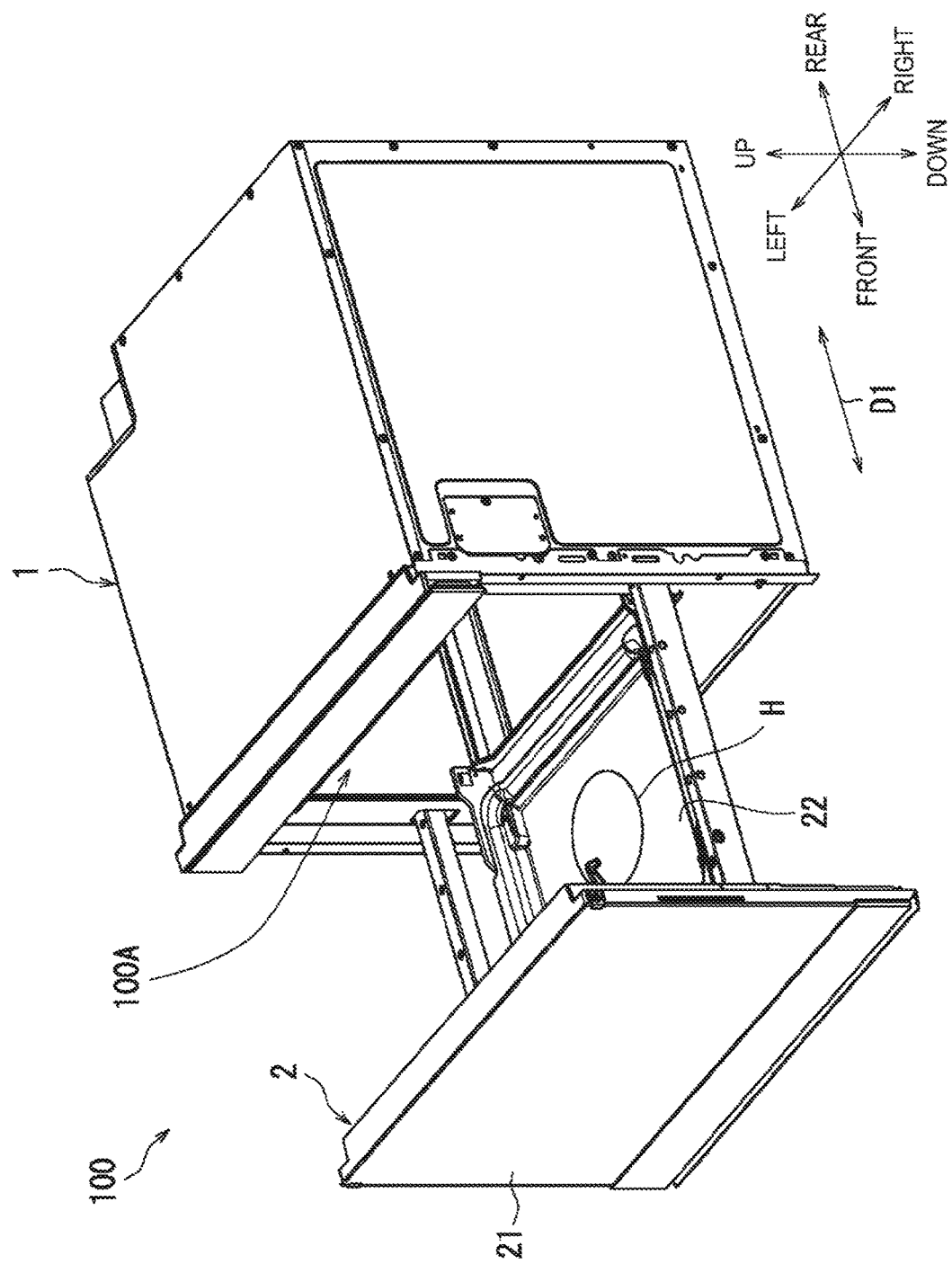
FIG. 1 is a perspective view illustrating an appearance of a pull-out heating cooking apparatus according to an embodiment of the present invention.

Hereinafter, an embodiment of a pull-out heating cooking apparatus according to the present invention will be described with reference to the drawings. In the drawings, the same or equivalent components are denoted by the same reference signs and description thereof will not be repeated.

Figure 2:
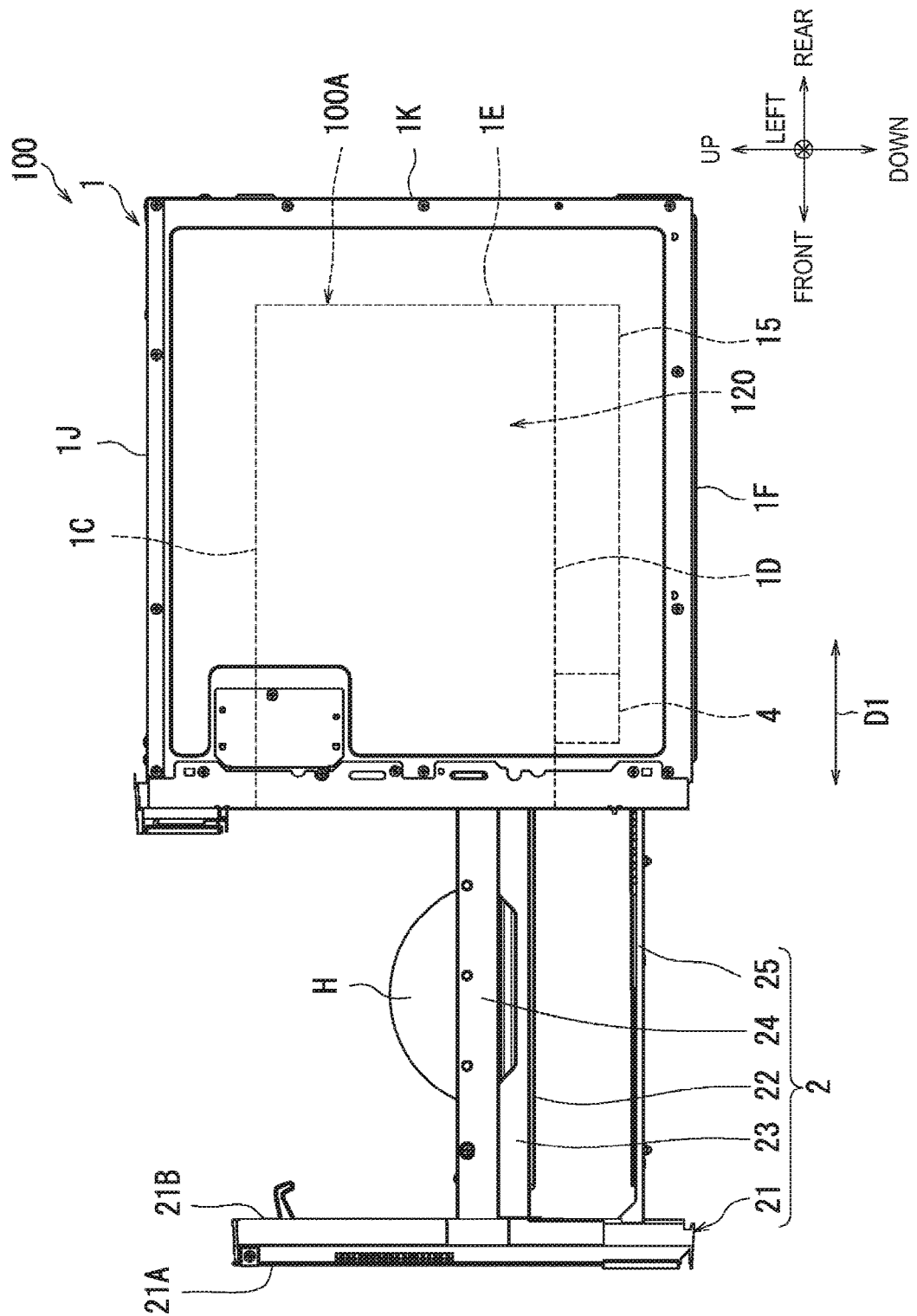
FIG. 2 is a right side view illustrating the pull-out heating cooking apparatus according to the present embodiment.
Figure 3:
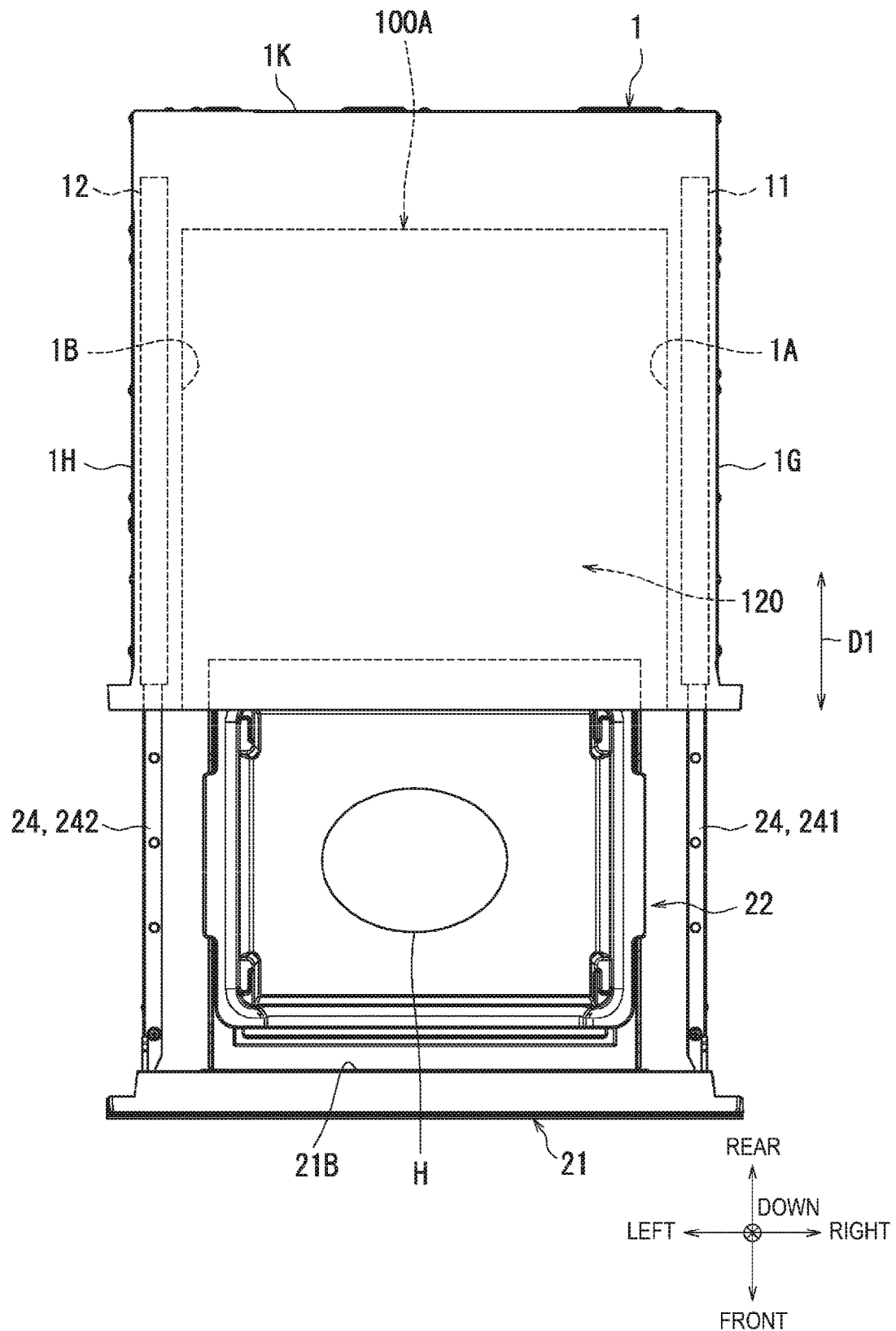
FIG. 3 is a top view illustrating the pull-out heating cooking apparatus according to the present embodiment.

A pull-out heating cooking apparatus 100 according to the present embodiment will be described with reference to FIG. 1 to FIG. 3. FIG. 1 is a perspective view illustrating an appearance of the pull-out heating cooking apparatus 100 according to the present embodiment. FIG. 2 is a right side view illustrating the pull-out heating cooking apparatus 100 according to the present embodiment. FIG. 3 is a top view illustrating the pull-out heating cooking apparatus 100 according to the present embodiment. More specifically, FIG. 1 to FIG. 3 illustrate the pull-out heating cooking apparatus 100 in a state where a pull-out body 2 is pulled out. Further, FIG. 1 illustrates the appearance of the pull-out heating cooking apparatus 100 when viewed from above obliquely from the right. The pull-out heating cooking apparatus 100 is one example of a heating cooking apparatus.

The pull-out heating cooking apparatus 100 heats and cooks an object H to be heated. The object H to be heated is, for example, a food product. As illustrated in FIG. 1, the pull-out heating cooking apparatus 100 includes a heating chamber 1, a pull-out body 2, and a microwave supply unit 15. The microwave supply unit 15 is an example of the heating cooking unit.

The pull-out body 2 is freely pulled out with respect to the heating chamber 1. More specifically, the pull-out body 2 can be pulled out and pulled in with respect to the heating chamber 1. Specifically, the pull-out body 2 includes a lid portion 21, a placing portion 22, and a support portion 23.

The lid portion 21 is a plate-like member having a substantially rectangular shape. Specifically, the lid portion 21 includes a glass plate having a rectangular shape and a metal plate located on an outer periphery of the glass plate. The lid portion 21 includes a front face 21A and a rear face 21B.

The lid portion 21 can open and close an opening on a front side of the heating cooking chamber 100A. Specifically, the lid portion 21 moves between a closed position and an open position. The open position indicates a position where the lid portion 21 opens the opening. On the other hand, the closed position indicates a position where the lid portion 21 covers the opening.

An object H to be heated can be placed on the placing portion 22. The placing portion 22 is, for example, a plate-like member made of a ceramic or a glass. The support portion 23 is fixed to the rear face 21B of the lid portion 21, and supports a peripheral portion of the placing portion 22 such that the placing portion 22 is held in a horizontal state. A material of the support portion 23 includes a metal. The placing portion 22 and the support portion 23 are pulled out of the heating cooking chamber 100A to the outside by the pull-out body 2 being pulling out. On the other hand, the placing portion 22 and the support portion 23 are contained in the heating cooking chamber 100A in a state where the pull-out body 2 is pulled in.

In the present embodiment, a side on which the lid portion 21 of the pull-out heating cooking apparatus 100 is disposed is defined as a front side of the pull-out heating cooking apparatus 100, and a side opposite to the front side is defined as a rear side of the pull-out heating cooking apparatus 100. Further, a right side when the pull-out heating cooking apparatus 100 is viewed from the front side is defined as a right side of the pull-out heating cooking apparatus 100, and a side opposite to the right side is defined as a left side of the pull-out heating cooking apparatus 100. Note that these orientations do not limit the orientation of the pull-out heating cooking apparatus according to the present invention when in use.

As illustrated in FIG. 1 to FIG. 3, the heating chamber 1 is a box-like member. Specifically, the heating chamber 1 includes a right outer wall 1G, a left outer wall 1H, a top outer wall 1J, a bottom outer wall 1F, and a back outer wall 1K. The heating chamber 1 also includes a heating cooking chamber 100A therein.

The heating cooking chamber 100A includes a container space 120 that contains the object H to be heated. The container space 120 has a predetermined capacity as a space that can contain the object H to be heated. The heating cooking chamber 100A further includes a right wall 1A, a left wall 1B, a top wall 1C, a bottom wall 1D, and a back wall 1E. The shape of the heating cooking chamber 100A is, for example, a substantially rectangular parallelepiped shape. Materials of the right wall 1A, the left wall 1B, the top wall 1C, the bottom wall 1D, and the back wall 1E are, for example, a metal.

The heating chamber 1 further includes a space between the bottom wall 1D and the bottom outer wall 1F. The heating chamber 1 further includes a space between the right wall 1A and the right outer wall 1G. The heating chamber 1 further includes a space between the left wall 1B and the left outer wall 1H. The heating chamber 1 further includes a space between the top wall 1C and the top outer wall 1J. The heating chamber 1 further includes a space between the back wall 1E and the back outer wall 1K.

The microwave supply unit 15 supplies microwaves into the heating cooking chamber 100A. The microwave supply unit 15 is located, for example, in a space between the bottom wall 1D and the bottom outer wall 1F. Specifically, the microwave supply unit 15 includes a radiation chamber, a magnetron, a waveguide, a rotary antenna, and an antenna motor. The magnetron generates microwaves. The waveguide propagates the microwaves generated by the magnetron to the radiation chamber. The rotary antenna is accommodated in the radiation chamber. The antenna motor drives the rotary antenna. The rotary antenna agitates microwaves and supplies the microwaves into the heating cooking chamber 100A. The microwaves include, for example, a radio wave of 2.4 GHz.

Figure 4:
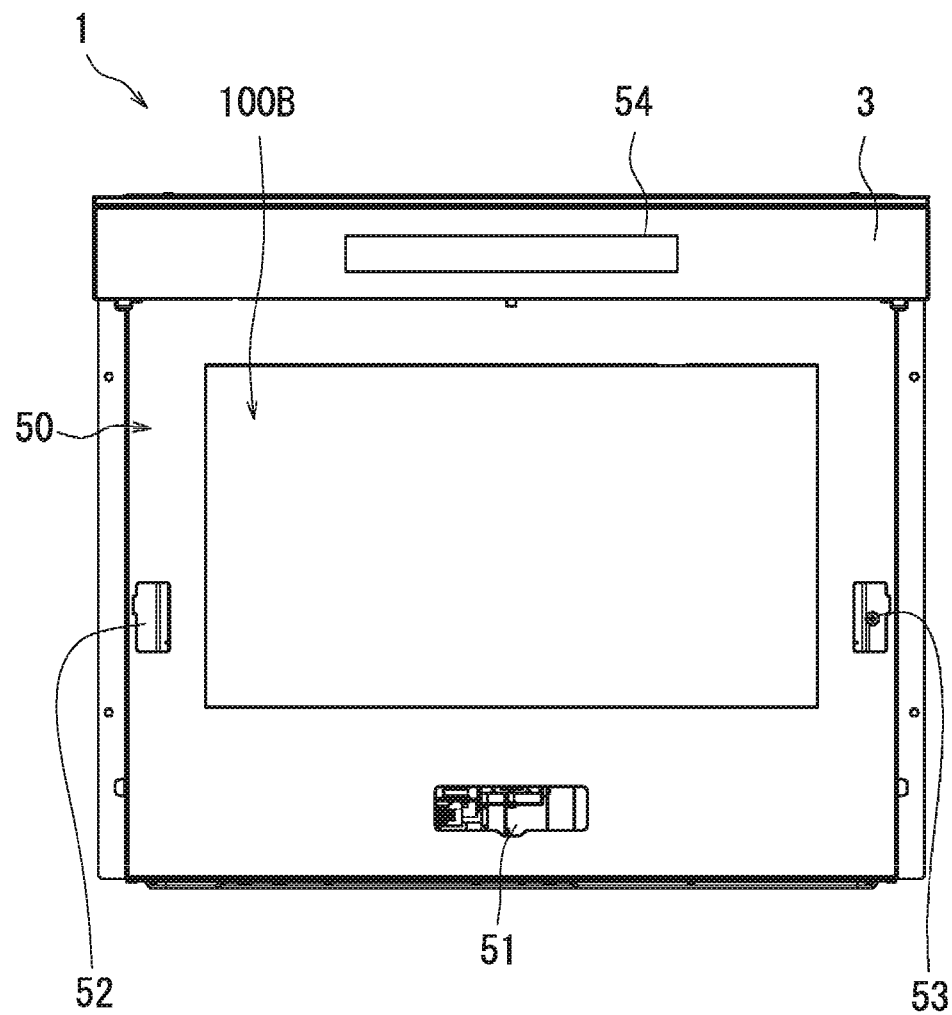
FIG. 4 is a front view of a heating chamber according to the present embodiment.

The front side of the heating cooking chamber 100A is opened for allowing the object H to be heated to be inserted and removed. With reference to FIG. 4, the opening for inserting and removing the object H to be heated will be described. FIG. 4 is a front view of the heating chamber 1.

As illustrated in FIG. 1 to FIG. 4, the heating chamber 1 further includes a front face panel 50 and an opening 100B on the front face side. The opening 100B has a rectangular shape. The opening 100B and the heating cooking chamber 100A communicate with each other. The front face panel 50 is disposed on an outer periphery of the opening 100B. Specifically, the front face panel 50 is a plate-like member having a square annular shape. The front face panel 50 includes a first through hole 51, a second through hole 52, a third through hole 53, and a fourth through hole 54.

The first through hole 51, the second through hole 52, the third through hole 53, and the fourth through hole 54 are formed around the opening 100B. Specifically, the first through-hole 51 is formed at a position on a lower side of the opening 100B. The second through-hole 52 is formed at a position on a left side of the opening 100B. The third through-hole 53 is formed at a position on a right side of the opening 100B. The fourth through-hole 54 is formed at a position on an upper side of the opening 100B. The fourth through-hole 54 and a space between a top wall 1C and a top outer wall 1J communicate with each other.

Next, as illustrated in FIG. 1 to FIG. 4, a drive mechanism of the pull-out body 2 will be described in detail. The pull-out body 2 further includes a pair of slide members 24 and a support member 25 in addition to the lid portion 21, the support portion 23, and the placing portion 22.

The support member 25 moves along a first direction D1 with respect to the heating chamber 1. The first direction D1 is along the front-rear direction. The support member 25 is a member having the front-rear direction as a longitudinal direction. The lid portion 21 is attached to one end portion of the support member 25. The other end portion of the support member 25 includes a rack portion. The rack portion includes a plurality of teeth.

Meanwhile, the heating chamber 1 further includes a drive mechanism 4. The drive mechanism 4 is contained in a space between the bottom wall 1D and the bottom outer wall 1F. For example, the drive mechanism 4 includes a drive motor 41 and a pinion. The pinion is attached to a tip end portion of the drive motor 41. The drive motor 41 rotates the pinion.

The support member 25 is inserted into the first through-hole 51. The pinion engages with the rack portion of the support member 25. Furthermore, the support member 25 moves in the front-rear direction when the pinion rotates. As a result, the lid portion 21 moves between the closed position and the open position.

The pair of slide members 24 regulate the movement direction of the pull-out body 2 in the front-rear direction. The pair of slide members 24 are fixed to the rear face 21B of the lid portion 21. Specifically, the pair of slide members 24 includes a right slide member 241 and a left slide member 242. Each of the right slide member 241 and the left slide member 242 is a member having the front-rear direction as a longitudinal direction. The right slide member 241 and the left slide member 242 oppose each other in the left-right direction. One end portion of the right slide member 241 is attached to a right edge portion of the rear face 21B of the lid portion 21. One end portion of the left slide member 242 is attached to a left edge portion of the rear face 21B of the lid portion 21.

Meanwhile, the heating chamber 1 further includes a right slide rail 11 and a left slide rail 12. The right slide rail 11 is fixed in a space between the right wall 1A and the right outer wall 1G. The left slide rail 12 is fixed in a space between the left wall 1B and the left outer wall 1H. Each of the right slide rail 11 and the left slide rail 12 is a member having the front-rear direction as a longitudinal direction.

The right slide member 241 is inserted into the third through-hole 53. The right slide member 241 is supported to be slidable along the right slide rail 11. The left slide member 242 is inserted into the second through-hole 52. The left slide member 242 is supported to be slidable along the left slide rail 12.

Figure 5:
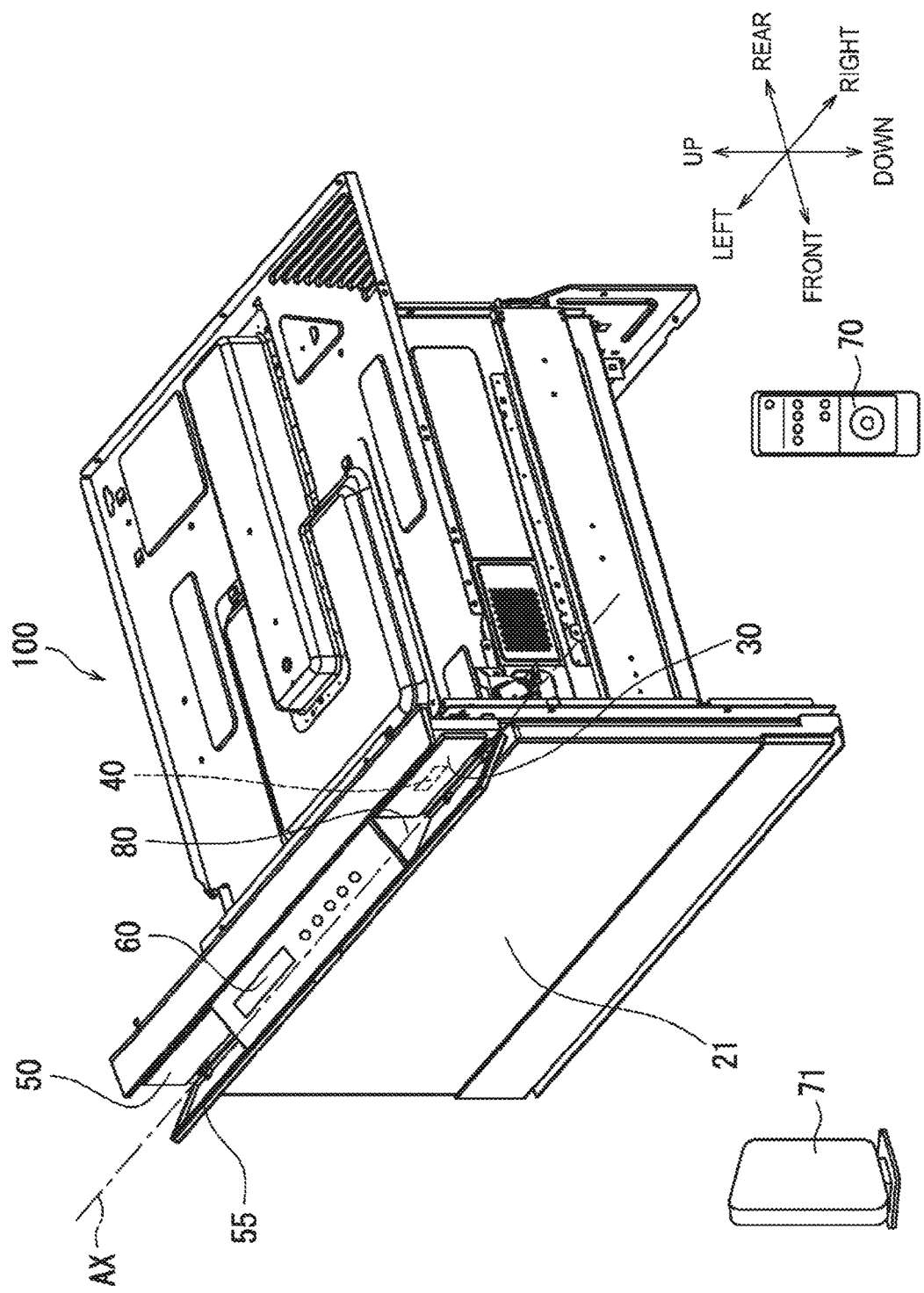
FIG. 5 is a perspective view illustrating an appearance of a pull-out heating cooking apparatus according to the present embodiment.
Figure 6:
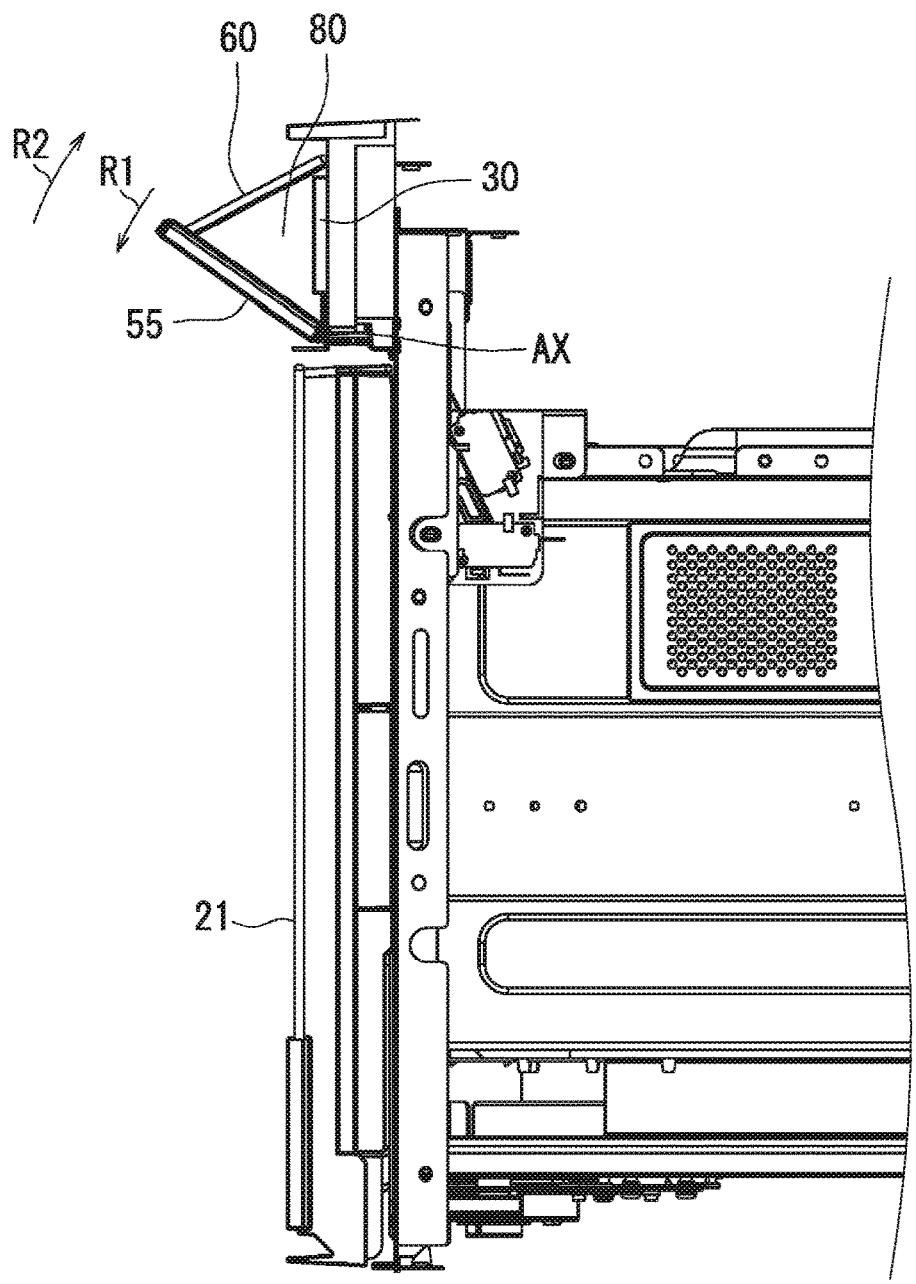
FIG. 6 is a right side view illustrating the pull-out heating cooking apparatus according to the present embodiment.
Figure 6:
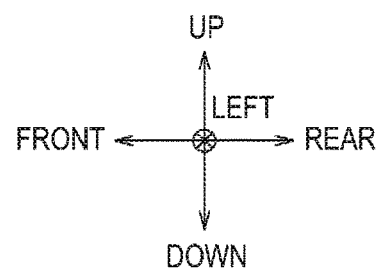

Next, an operation method of operating the pull-out heating cooking apparatus 100 will be described with reference to FIG. 5 and FIG. 6. FIG. 5 is a perspective view illustrating an appearance of the pull-out heating cooking apparatus 100 according to the present embodiment. FIG. 6 is a right side view illustrating the pull-out heating cooking apparatus 100 according to the present embodiment. FIG. 5 and FIG. 6 illustrate the pull-out heating cooking apparatus 100 in a state where the pull-out body 2 is pulled in. Further, FIG. 5 illustrates the appearance of the pull-out heating cooking apparatus 100 when viewed from above obliquely from the right. Note that in FIG. 5 and FIG. 6, for the sake of simplicity of the drawings, a right outer wall 1G, a left outer wall 1H, the top outer wall 1J, a bottom outer wall 1F, and a back outer wall 1K are omitted.

As illustrated in FIG. 5 and FIG. 6, the pull-out heating cooking apparatus 100 further includes an operation unit 60. The operation unit 60 is located on an upper portion of the front face panel 50. The operation unit 60 is located at a center of the front face panel 50 in the left-right direction.

The operation unit 60 includes an operation panel and a display unit. The operation panel receives operation information for the microwave supply unit 15 or the drive mechanism 4. The operation information includes, for example, a cooking method for heating and cooking the object H to be heated, or information about movement of the lid portion 21 between the closed position and the open position. More specifically, when being operated by a user, the operation panel receives the operation information. Specifically, the operation panel includes various keys. The display unit displays various pieces of information. The display unit includes a liquid crystal panel.

Figure 7:
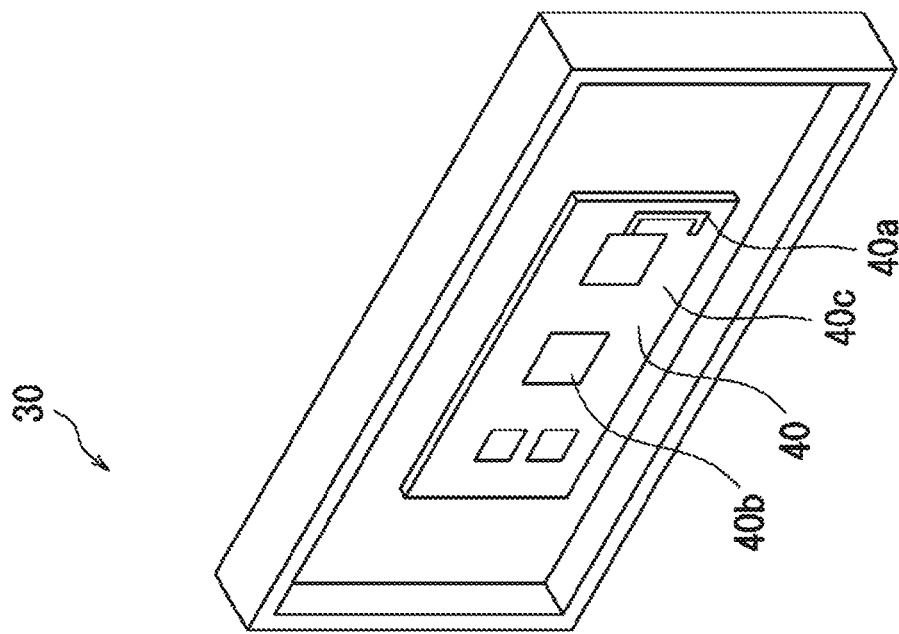
FIG. 7 is an exploded perspective view of a container portion according to the present embodiment.

Next, a communication method in which the pull-out heating cooking apparatus 100 and the external device communicate with each other will be described with reference to FIG. 7. FIG. 7 is an exploded perspective view of the container portion 30. As illustrated in FIG. 4 to FIG. 7, the pull-out heating cooking apparatus 100 further includes the container portion 30, a communication unit 40, and a movable member 55.

The communication unit 40 wirelessly communicates with an external device. The communication unit 40 includes, for example, an antenna 40a, a wireless communication circuit 40b, and a substrate 40c. Wireless communication includes, for example, near field wireless communication. Specifically, the wireless communication includes, for example, Wi-Fi communication.

The external device includes, for example, a Wi-Fi router 71. The Wi-Fi router 71 is located, for example, at a location remote from the pull-out heating cooking apparatus 100. For example, the Wi-Fi router 71 is disposed in a different room from a room where the pull-out heating cooking apparatus 100 is disposed. The communication unit 40 and the Wi-Fi router 71 communicate with each other by a radio wave in 5 GHz or 2.4 GHz. Further, the Wi-Fi router 71 wirelessly communicates with, for example, the smartphone 70. The Wi-Fi router 71 receives cooking information from the smartphone 70. Then, the Wi-Fi router 71 transmits the cooking information to the communication unit 40. In other words, the communication unit 40 receives the cooking information from the Wi-Fi router 71.

The cooking information includes, for example, a cooking method for cooking the object H to be heated searched using the Internet by the smartphone 70. The cooking information includes, for example, a large volume of information.

The container portion 30 contains the communication unit 40. The container portion 30 is, for example, a box-like member having a rectangular parallelepiped shape. A material of the container portion 30 is, for example, a non-metal. Specifically, the material of the container portion 30 is a synthetic resin having a lower heat conductivity than a metal and having radio wave transmissivity. The container portion 30 is located on an upper portion of the front face panel 50 of the heating chamber 1. The container portion 30 is located on an edge portion on a right side of the front face panel 50 in the left-right direction.

The movable member 55 is, for example, a plate-like body having a rectangular shape. The movable member 55 faces the front face panel 50. The movable member 55 is located on an upper portion of the heating chamber 1. Further, the container portion 30 is located at a central portion of the heating chamber 1 in the left-right direction. A material of the movable member 55 is a metal.

The movable member 55 moves between a first position and a second position. Specifically, the movable member 55 has a rotation axis AX. The rotation axis AX extends along a lower side of the plate-like body having a rectangular shape, for example. The movable member 55 rotates in a first rotation direction R1 and in a second rotation direction R2.

Specifically, by the operation of the user, the movable member 55 rotates in the first rotation direction R1 from the second position to move to the first position. The first position indicates a position of the movable member 55 when the movable member 55 is separated from the container portion 30. For example, a large space is formed between a rear face of the movable member 55 and the front face panel 50. As a result, the radio wave from the Wi-Fi router 71 reaches the container portion 30 without passing through the movable member 55.

Figure 8:
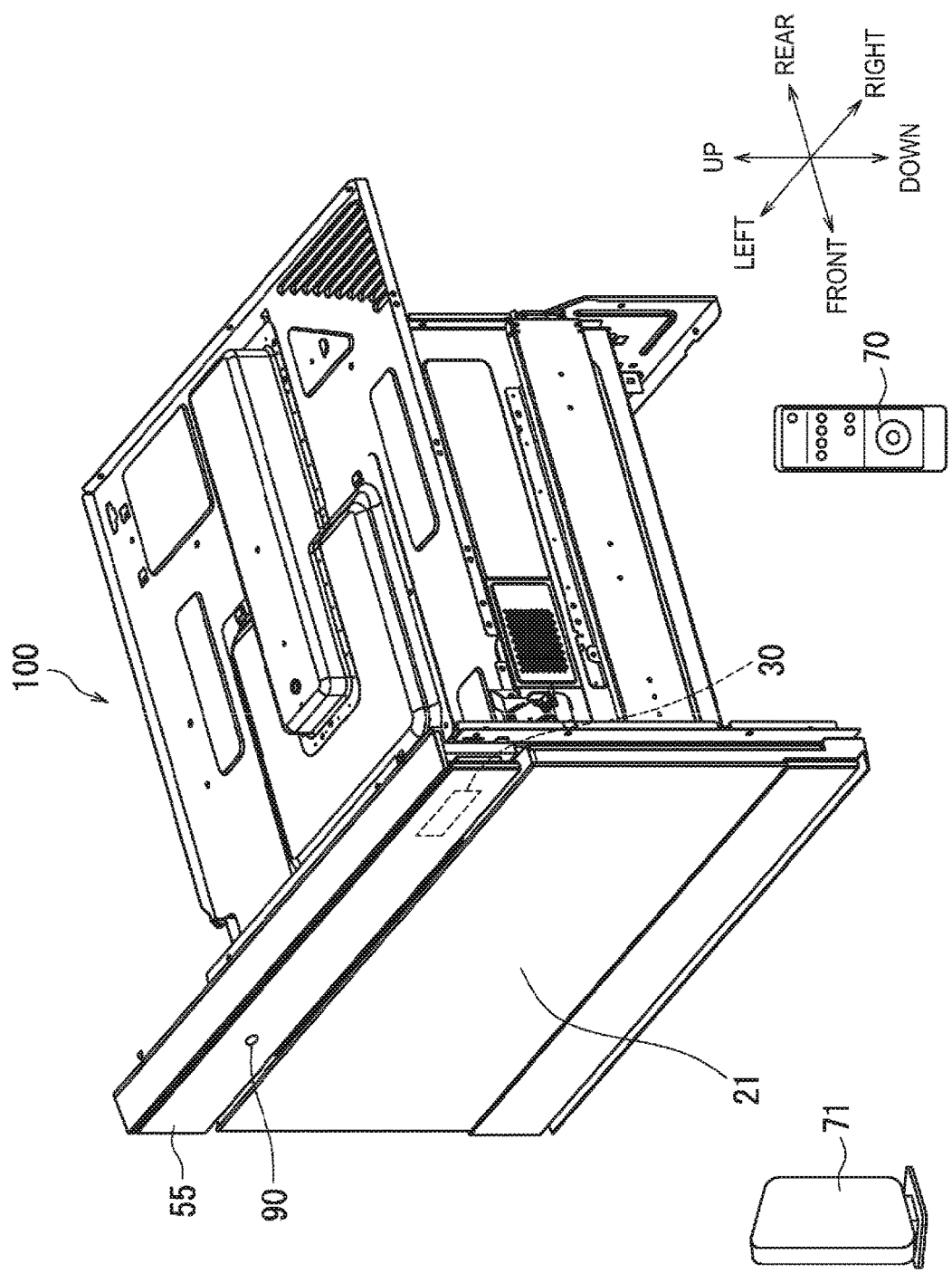
FIG. 8 is a perspective view illustrating an appearance of a pull-out heating cooking apparatus according to the present embodiment.
Figure 9:
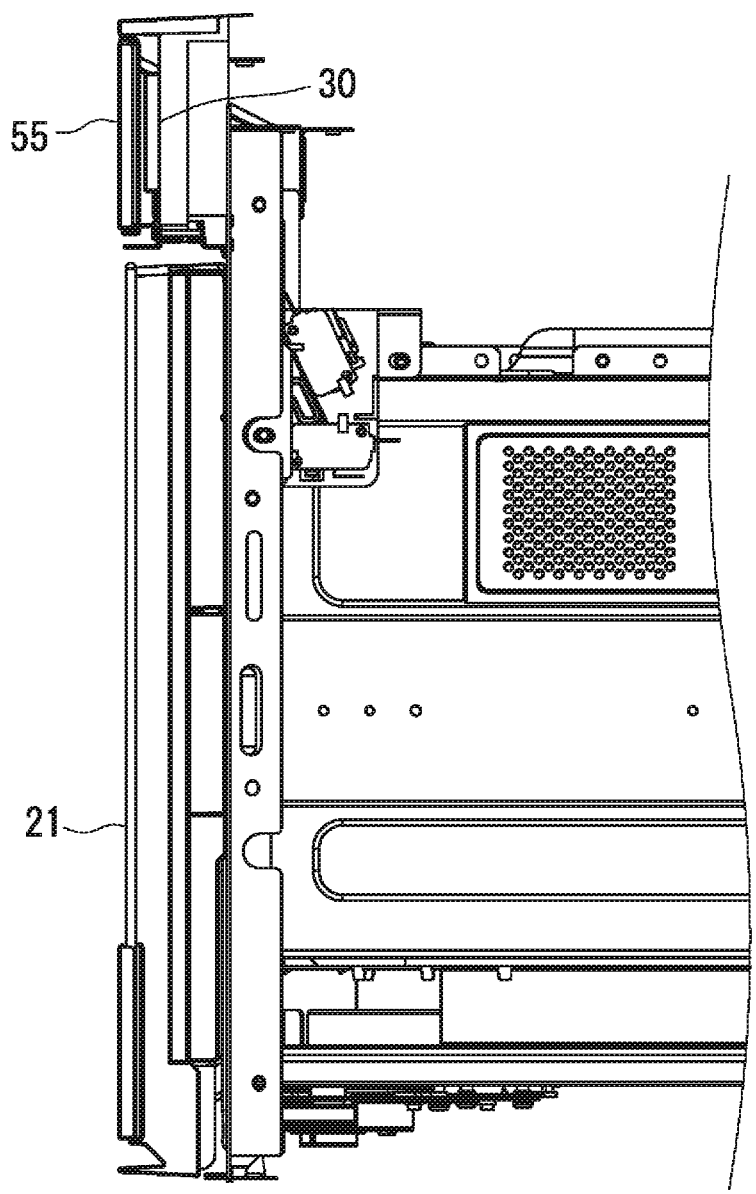
FIG. 9 is a right side view illustrating the pull-out heating cooking apparatus according to the present embodiment.
Figure 9:
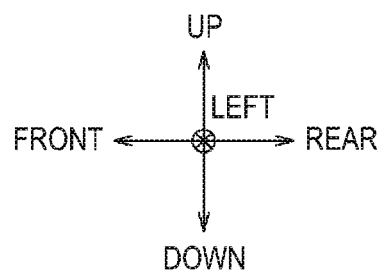

Subsequently, a communication method in which the pull-out heating cooking apparatus 100 and the external device communicate with each other when the movable member 55 is located in the second position will be described with reference to FIG. 8 and FIG. 9. FIG. 8 is a perspective view illustrating an appearance of the pull-out heating cooking apparatus 100 according to the present embodiment. FIG. 9 is a right side view illustrating the pull-out heating cooking apparatus 100 according to the present embodiment. FIG. 8 and FIG. 9 illustrate the pull-out heating cooking apparatus 100 in a state where the pull-out body 2 is pulled in. FIG. 8 illustrates the appearance of the pull-out heating cooking apparatus 100 when viewed from above obliquely from the right. Note that, in FIG. 8 and FIG. 9, for the sake of simplicity of the drawings, the right outer wall 1G, the left outer wall 1H, the top outer wall 1J, the bottom outer wall 1F, and the back outer wall 1K are omitted.

As illustrated in FIG. 8 and FIG. 9, by the operation of the user, the movable member 55 rotates in the second rotation direction R2 from the first position to move to the second position. The second position indicates a position of the movable member 55 when the movable member 55 is closer to the container portion 30 than in the first position. For example, the rear face of the movable member 55 and the front face panel 50 are in contact with each other. As a result, the appearance of the pull-out heating cooking apparatus 100 is improved. Note that the radio wave from the Wi-Fi router 71 reaches the container portion 30 through the movable member 55.

As described above, when the movable member 55 is located in the first position, the radio wave from the Wi-Fi router 71 reaches the container portion 30 without passing through the movable member 55. On the other hand, when the movable member 55 is located in the second position, the radio wave from the Wi-Fi router 71 reaches the container portion 30 without passing through the movable member 55. Thus, when a communication state between the external device and the communication unit 40 is poor, the user locates the movable member 55 in the first position. As a result, the external device and the communication unit 40 can properly communicate with each other.

In a case where the material of the movable member 55 is a metal, when the movable member 55 is located in the first position, most of the radio wave from the Wi-Fi router 71 is not blocked by the movable member 55, and reaches the container portion 30. On the other hand, when the movable member 55 is located in the second position, a portion of the radio wave from the Wi-Fi router 71 is blocked by the movable member 55, and another portion of the radio waver reaches the container portion 30. Thus, when the communication state between the external device and the communication unit 40 is poor, the user locates the movable member 55 in the first position. As a result, the external device and the communication unit 40 can properly communicate with each other.

More specifically, the operation unit 60 is attached to the movable member 55. Specifically, the operation unit 60 is attached to the rear face of the movable member 55. Then, the operation unit 60 moves together with the movable member 55. When the movable member 55 is located in the first position, the operation unit 60 is located in a space formed between the rear face of the movable member 55 and the front face panel 50. As a result, the user can operate the operation unit 60. On the other hand, when the movable member 55 is located in the second position, the operation unit 60 is inserted into the fourth through-hole 54 and is located in the heating chamber 1. As a result, the user cannot operate the operation unit 60.

As illustrated in FIG. 5 to FIG. 9, the pull-out heating cooking apparatus 100 further includes a control unit, a storage unit, and an accommodation portion 80.

The storage unit includes a random access memory (RAM) and a read only memory (ROM). The storage unit 6 stores a control program used for controlling an operation of each unit of the pull-out heating cooking apparatus 100.

The control unit is a hardware circuit that includes a processor such as a central processing unit (CPU). The control unit executes the control program stored in the storage unit. The control unit and the communication unit 40 communicate with each other by wire. The control unit and the operation unit 60 communicate with each other by wire.

An accommodation portion 80 accommodates the storage unit and the control unit. The accommodation portion 80 is, for example, a box-like member having a triangular prism shape. A material of the accommodation portion 80 is, for example, a metal. Specifically, the material of the accommodation portion 80 is a synthetic resin having a lower heat conductivity than that of the metal. The accommodation portion 80 is located at the upper portion of the front face panel 50. The operation unit 60 is located at the center of the front face panel 50 in the left-right direction.

Specifically, the accommodation portion 80 is attached between the movable member 55 and the operation unit 60. Then, the accommodation portion 80 moves together with the movable member 55 and the operation unit 60. When the movable member 55 is located in the first position, the accommodation portion 80 is located in a space formed between the rear face of the movable member 55 and the front face panel 50. On the other hand, when the movable member 55 is located in the second position, the accommodation portion 80 is inserted into the fourth through-hole 54 and is located in the heating chamber 1.

The pull-out heating cooking apparatus 100 further includes a display unit 90. The display unit 90 displays communication information indicating a communication state with the external device. Specifically, the display unit 90 is a light emitting diode (LED). Then, the display unit 90 is located in a front face of the movable member 55. When the external device and the communication unit 40 can communicate with each other with high sensitivity, the display unit 90 is illuminated. On the other hand, when the external device and the communication unit 40 can communicate with each other with low sensitivity, the display unit 90 blinks.

As described above, since the communication information is displayed, the user can recognize the communication information. As a result, it is possible to appropriately determine whether to locate the movable member 55 in the first position or in the second position. Thus, when the communication state between the external device and the communication unit 40 is poor, the user locates the movable member 55 in the first position.

Figure 10:
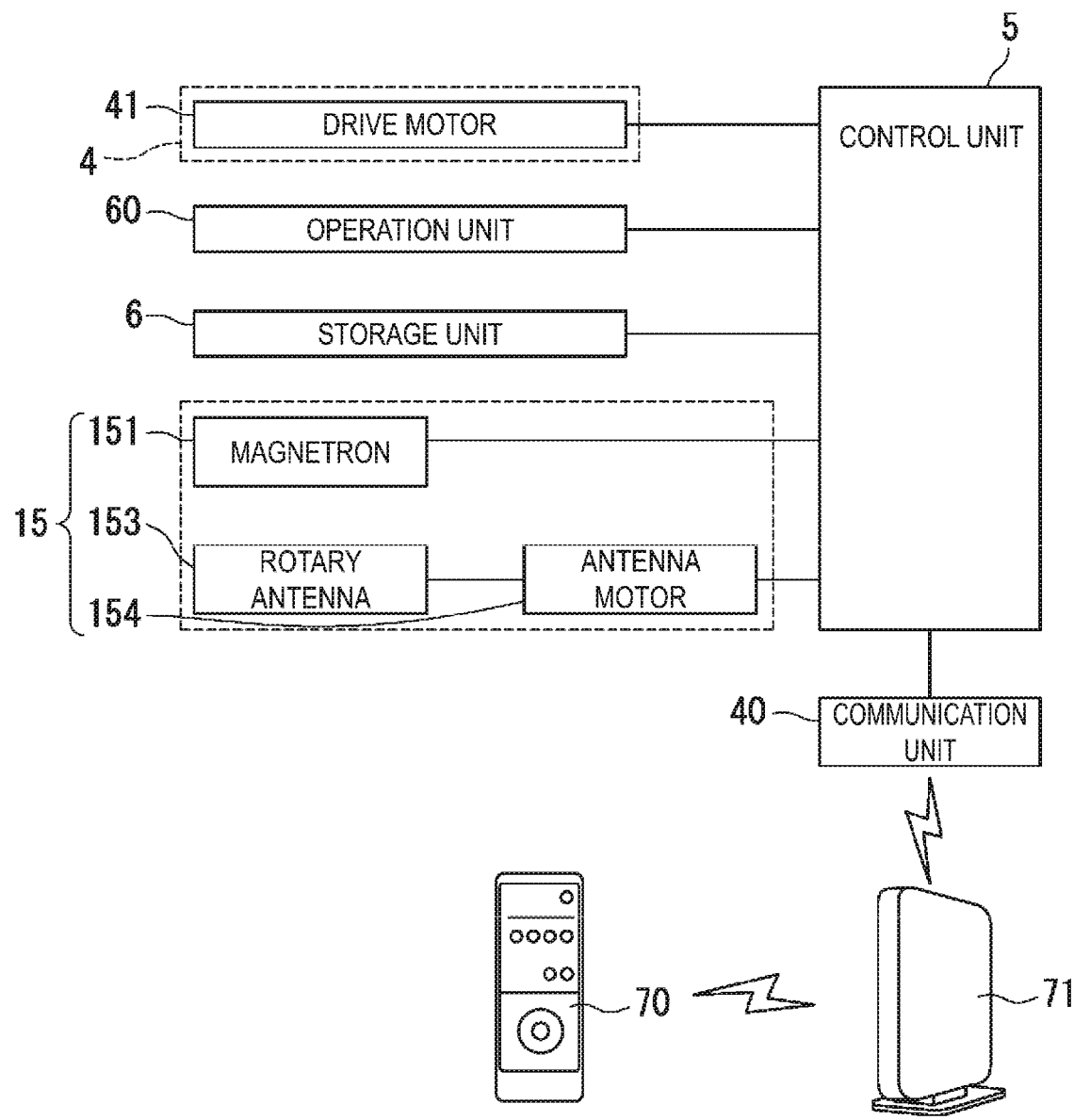
FIG. 10 is a block diagram illustrating a configuration of the pull-out heating cooking apparatus according to the present embodiment.

A configuration of the pull-out heating cooking apparatus 100 will be described in detail with reference to FIG. 10. FIG. 10 is a block diagram illustrating a configuration of the pull-out heating cooking apparatus 100 according to the present embodiment.

As illustrated in FIG. 10, the control unit 5 controls the magnetron 151, the antenna motor 154, the drive motor 41, the operation unit 60, the communication unit 40 and the storage unit 6 by executing the control program stored in the storage unit 6.

Specifically, the user inputs the operation information through the operation unit 60. The control unit 5 controls the drive motor 41 based on the operation information. The user then uses the Internet on the smartphone 70 to search for the cooking method. The user sends the cooking information from the smartphone 70 to the Wi-Fi router 71. The Wi-Fi router 71 transmits the cooking information to the communication unit 40. The communication unit 40 outputs the cooking information to the control unit 5. The control unit 5 controls the magnetron 151 and the antenna motor 154 based on the cooking information.

Figure 11:
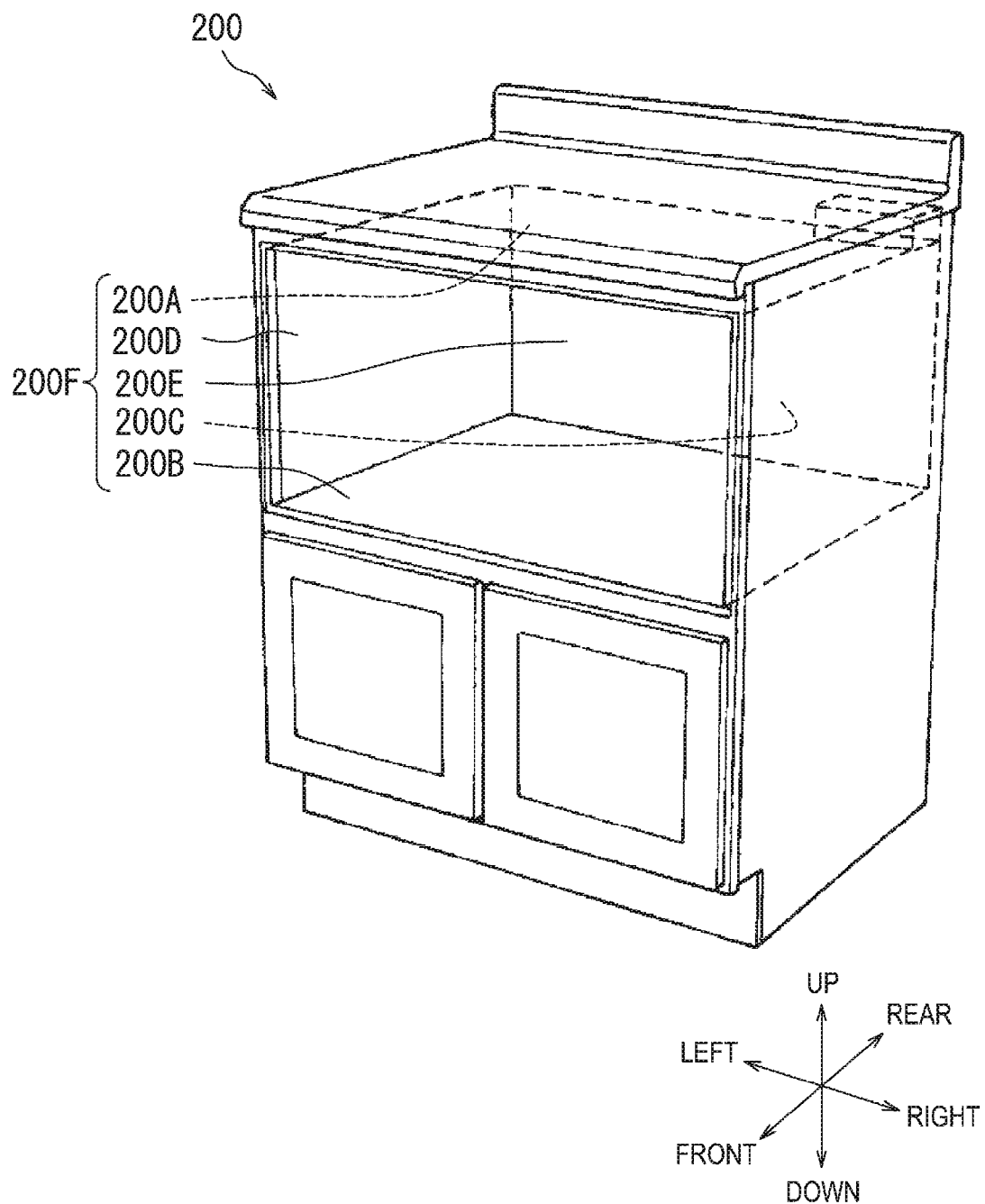
FIG. 11 is a diagram illustrating an appearance of a cabinet to which the pull-out heating cooking apparatus according to the present embodiment is attached.

Subsequently, a cabinet 200 to which the pull-out heating cooking apparatus 100 is attached will be described with reference to FIG. 11. FIG. 11 is a diagram illustrating an appearance of the cabinet 200 to which the pull-out heating cooking apparatus 100 according to the present embodiment is attached.

The pull-out heating cooking apparatus 100 is installed in the cabinet 200 in a built-in manner. As illustrated in FIG. 11, the cabinet 200 includes an upper wall 200A, a lower wall 200B, a right wall 200C, a left wall 200D, and a rear wall 200E. The upper wall 200A, the lower wall 200B, the right wall 200C, the left wall 200D, and the rear wall 200E form an accommodation portion 200F. The accommodation portion 200F is a rectangular parallelepiped space into which the pull-out heating cooking apparatus 100 is fitted.

An embodiment of the present invention has been described above with reference to the drawings. However, the present invention is not limited to the embodiment described above, and the present invention can be implemented in various modes without departing from the gist thereof. The drawings primarily schematically illustrate each of the constituent elements for the sake of easier understanding, and the thickness, length, quantity, and the like of each of the illustrated constituent elements are different from the actual thickness, length, quantity, and the like by reason of creation of the drawings. The material, shape, dimensions, and the like of each of the constituent elements illustrated in the embodiment described above are merely exemplary and are not particularly limiting, and various modifications can be made within the scope not departing from the effects of the present invention in essence.

(1) As has been described with reference to FIG. 1 to FIG. 11, the heating cooking unit is the microwave supply unit 15. However, the present invention is not limited to this. The heating cooking unit may be a grille heater. In other words, the pull-out heating cooking apparatus 100 may be a toaster.

The heating cooking unit may be an air sending unit for sending hot air into the heating cooking chamber 100A, may be the microwave supply unit 15 and the grille heater, may be the microwave supply unit 15 and the air sending unit, may be the grille heater and the air sending unit, and may be the microwave supply unit 15, the grille heater, and the air sending unit.

(2) The pull-out heating cooking apparatus 100 may include a mesh rack. The mesh rack is placed on the placing portion 22 of the pull-out body 2.

(3) In the pull-out heating cooking apparatus 100, the communication unit 40 receives the cooking information from the Wi-Fi router 71, but the present invention is not limited to this. For example, the cooking information may be received from the smartphone 70 by infrared or Bluetooth (trade name).

INDUSTRIAL APPLICABILITY

The present invention is useful in the field of a heating cooking apparatus, for example.

REFERENCE SIGNS LIST

2 Pull-out body
5 Control Unit
15 Microwave supply unit
30 Container portion
40 Communication unit
55 Movable member
60 Operation unit
70 Smartphone
71 Wi-Fi router
80 Accommodation portion
90 Display unit
100 Pull-out heating cooking apparatus
100A Heating cooking chamber

The invention claimed is:

1. A heating cooking apparatus comprising:
a heating cooking unit configured to heat and cook an object to be heated;
a communication unit configured to wirelessly communicate with an external device;
a container portion configured to contain the communication unit;
a movable member configured to move between a first position and a second position;
an operation unit configured to receive operation information for the heating cooking unit, and attached to the movable member; and
a front face panel provided to the heating cooking unit on a front face side and including a through hole,
wherein the first position indicates a position of the movable member when the movable member is separated from the container portion,
the second position indicates a position of the movable member when the movable member is closer to the container portion than in the first position, and
the operation unit is exposed when the movable member is in the first position, and is inserted into the through hole and located in the heating cooking apparatus when the movable member is in the second position.

2. The heating cooking apparatus according to claim 1, wherein a material of the movable member is metal, and a material of the container portion is non-metal.

3. The heating cooking apparatus according to claim 1, further comprising:
a display unit configured to display communication information indicating a state of communication with the external device.

4. The heating cooking apparatus according to claim 1, further comprising:
a control unit configured to control the heating cooking unit; and
an accommodation portion configured to accommodate the control unit,
wherein the communication unit and the control unit communicate with each other by wire,
the communication unit outputs cooking information received from the external device to the control unit, and
the control unit heats and cooks the object to be heated based on the cooking information.

5. The heating cooking apparatus according to claim 1, further comprising:
a heating cooking chamber configured to contain the object to be heated,
wherein the heating cooking unit includes a microwave supply unit configured to supply microwaves into the heating cooking chamber, and
a material of the heating cooking chamber is metal.

6. A built-in heating cooking system comprising:
the heating cooking apparatus according to claim 1;
a pull-out body configured to be freely pulled out with respect to the heating cooking unit; and
a cabinet.

* * * * *